United States Patent
Kent

(10) Patent No.: US 8,212,792 B2
(45) Date of Patent: Jul. 3, 2012

(54) TOUCHSCREEN USING ORIENTED MICROSCOPIC LINEAR CONDUCTIVE ELEMENTS

(75) Inventor: Joel C. Kent, Fremont, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 948 days.

(21) Appl. No.: 11/893,041

(22) Filed: Aug. 14, 2007

(65) Prior Publication Data

US 2009/0046078 A1 Feb. 19, 2009

(51) Int. Cl.
*G06F 3/041* (2006.01)

(52) U.S. Cl. ............... 345/174; 428/297.4; 345/173

(58) Field of Classification Search ............ 345/173, 345/174, 176, 178; 200/512; 428/1.3, 1.4, 428/203, 204, 297.4; 174/126.1–126.4; 977/778, 977/784, 953

See application file for complete search history.

(56) References Cited

U.S. PATENT DOCUMENTS

| | | | |
|---|---|---|---|
| 4,353,552 A | 10/1982 | Pepper, Jr. | |
| 5,738,934 A | 4/1998 | Jones | |
| 6,469,267 B1 | 10/2002 | Welsh et al. | |
| 6,593,916 B1 | 7/2003 | Aroyan | |
| 6,650,319 B1 | 11/2003 | Hurst et al. | |
| 7,106,307 B2 | 9/2006 | Cok | |
| 7,180,508 B2 | 2/2007 | Kent et al. | |
| 7,477,242 B2 | 1/2009 | Cross et al. | |
| 7,956,287 B2 | 6/2011 | Takayama et al. | |
| 2003/0001826 A1 | 1/2003 | Richter et al. | |
| 2004/0265550 A1 | 12/2004 | Glatkowski et al. | |
| 2005/0012644 A1 | 1/2005 | Hurst et al. | |
| 2005/0209392 A1 | 9/2005 | Luo et al. | |
| 2005/0266162 A1 | 12/2005 | Luo et al. | |
| 2005/0267264 A1 | 12/2005 | Takei et al. | |
| 2006/0274048 A1 | 12/2006 | Spath et al. | |
| 2006/0274049 A1* | 12/2006 | Spath et al. ............... | 345/173 |
| 2006/0276056 A1 | 12/2006 | Ward et al. | |
| 2007/0074316 A1 | 3/2007 | Alden et al. | |
| 2007/0128905 A1 | 6/2007 | Speakman | |
| 2007/0178280 A1 | 8/2007 | Bower et al. | |
| 2008/0029292 A1* | 2/2008 | Takayama et al. .......... | 174/126.4 |
| 2008/0123078 A1 | 5/2008 | Saraf | |
| 2009/0046073 A1 | 2/2009 | Pennington et al. | |

FOREIGN PATENT DOCUMENTS

CN    1653414 A    8/2005

(Continued)

OTHER PUBLICATIONS

Yang, Y.; Huang, S.; He, H.; Mau, A.W. H.; Dai, L. J. Am. Chem. Soc. 1999, 121, 10832-10833.

(Continued)

*Primary Examiner* — Kevin M Nguyen

(57) ABSTRACT

A cover sheet assembly is provided for a touchscreen system. The cover sheet assembly includes an insulating layer having a surface configured to be disposed over an electrically conductive area of a substrate of the touchscreen system. An electrically conductive material is disposed on at least a portion of the insulating layer surface. The electrically conductive material includes a plurality of microscopic linear conductive elements arranged in a pattern that is oriented with respect to a first direction of a first polarization of light such that the electrically conductive material is more transparent to the first polarization of light than to a second polarization of light that is polarized in a second direction that is perpendicular to the first direction.

20 Claims, 5 Drawing Sheets

FOREIGN PATENT DOCUMENTS

| | | |
|---|---|---|
| CN | 1947203 A | 4/2007 |
| EP | 1739692 A | 1/2007 |
| WO | WO2007/022226 A2 | 2/2007 |
| WO | WO-2008/057615 A | 5/2008 |

OTHER PUBLICATIONS

Jana, N.; Gearheart, L.; Murphy, C.; Chem. Commun., 2001, 617-618.

Dai, L.; Patil, A.; Gong, X.; Guo, Z.; Liu, L.; Liu, Y.; Zhu, D. Chem. Phys. Chem. 2003, 4, 1150-1169.

International Search Report for International Application No. PCT/US2008/009718, mailed Jun. 24, 2009.

International Search Report for International Application No. PCT/US2008/009717, 2008.

Office action (and English translation) dated Jun. 29, 2011 from Chinese counterpart application 200880102972.4.

Communication of Oct. 12, 2011 from EPO for EP 08827391.7.

* cited by examiner

TOUCHSCREEN USING ORIENTED MICROSCOPIC LINEAR CONDUCTIVE ELEMENTS

BACKGROUND OF THE INVENTION

The invention relates generally to computer touchscreens, and more particularly, to electrically conductive materials for touchscreens.

Since their introduction in the early 1970s, touchscreens have afforded alternatives to keyboards for certain computer applications. In many situations the keyboard and mouse are eliminated, because the touchscreen provides the user with access to the computer. Both resistive and capacitive touchscreens typically include a substrate, such as a glass panel, that is positioned over the face of a display, for example a liquid crystal display (LCD). The substrate includes an electrically conductive material on a surface thereof. The electrically conductive material defines an electrically conductive area on the substrate surface for accepting a user's inputs to the touchscreen. An insulating layer is positioned over the electrically conductive area to provide a surface for the user to touch to select the inputs.

In a resistive touchscreen, the insulating layer forms a portion of a cover sheet that includes a second electrically conductive material located over a surface of the insulating layer facing the substrate. The cover sheet is spaced from the substrate by a plurality of insulating dots such that the two electrically conductive materials are spaced apart. When the cover sheet is touched by a user, the two electrically conductive materials engage each other at the location of the user's touch. In capacitive touchscreens, the insulating layer is deposited directly on the electrically conductive material on the substrate.

The electrically conductive materials on both the substrate and the insulating layer are typically formed from indium tin oxide (ITO). ITO is often used because ITO generally provides good transparency for a given value of electrical conductivity, as is desired for some touchscreen applications. However, because the supply of indium is limited, ITO may be relatively expensive. Moreover, the increasing demand for indium may cause ITO to become even more expensive as the world supply diminishes. To replace ITO, several types of microscopic linear conductive elements (MLCEs), such as molecules of conductive polymers, carbon nanotubes and/or metal nanofibers, have been proposed for use in the electrically conductive material that is present on the substrate and/or on the cover sheets of touchscreens. However, at least some of such proposed MLCE materials do not match the transparency of ITO for a given electrical conductivity.

There is a need to increase the transparency of MLCE-based electrically conductive materials for touchscreens while maintaining the desired degree of electrically conductivity of the electrically conductive material.

BRIEF DESCRIPTION OF THE INVENTION

In one embodiment, a cover sheet assembly is provided for a touchscreen system. The cover sheet assembly includes an insulating layer having a surface configured to be disposed over an electrically conductive area of a substrate of the touchscreen system. An electrically conductive material is disposed on at least a portion of the insulating layer surface. The electrically conductive material includes a plurality of microscopic linear conductive elements arranged in a pattern that is oriented with respect to a first direction of a first polarization of light such that the electrically conductive material is more transparent to the first polarization of light than to a second polarization of light that is polarized in a second direction that is perpendicular to the first direction.

In another embodiment, a substrate assembly is provided for a touchscreen system. The substrate assembly includes a substrate and an electrically conductive material disposed on at least a portion of a surface of the substrate to provide an electrically conductive touch area on the substrate. The electrically conductive material includes a plurality of microscopic linear conductive elements arranged in a pattern that is oriented with respect to a first direction of a first polarization of light such that the electrically conductive material is more transparent to the first polarization of light than to a second polarization of light that is polarized in a second direction that is perpendicular to the first direction.

In another embodiment, a substrate assembly is provided for a touchscreen system. The substrate assembly includes a substrate having a first surface and a second surface opposite the first surface, and a first electrically conductive material disposed on at least a portion of the first surface of the substrate to provide an electrically conductive touch area on the substrate. A second electrically conductive material is disposed on at least a portion of the second surface of the substrate. The second electrically conductive material includes a plurality of microscopic linear conductive elements arranged in a pattern that is oriented with respect to a first direction of a first polarization of light such that the second electrically conductive material is more transparent to the first polarization of light than to a second polarization of light that is polarized in a second direction that is perpendicular to the first direction.

DETAILED DESCRIPTION OF THE INVENTION

As used herein, a material is considered to be electrically conductive if there exists two points on the material that can be measured as having a resistance therebetween that is less than about ten MegaOhms.

Figure 1:
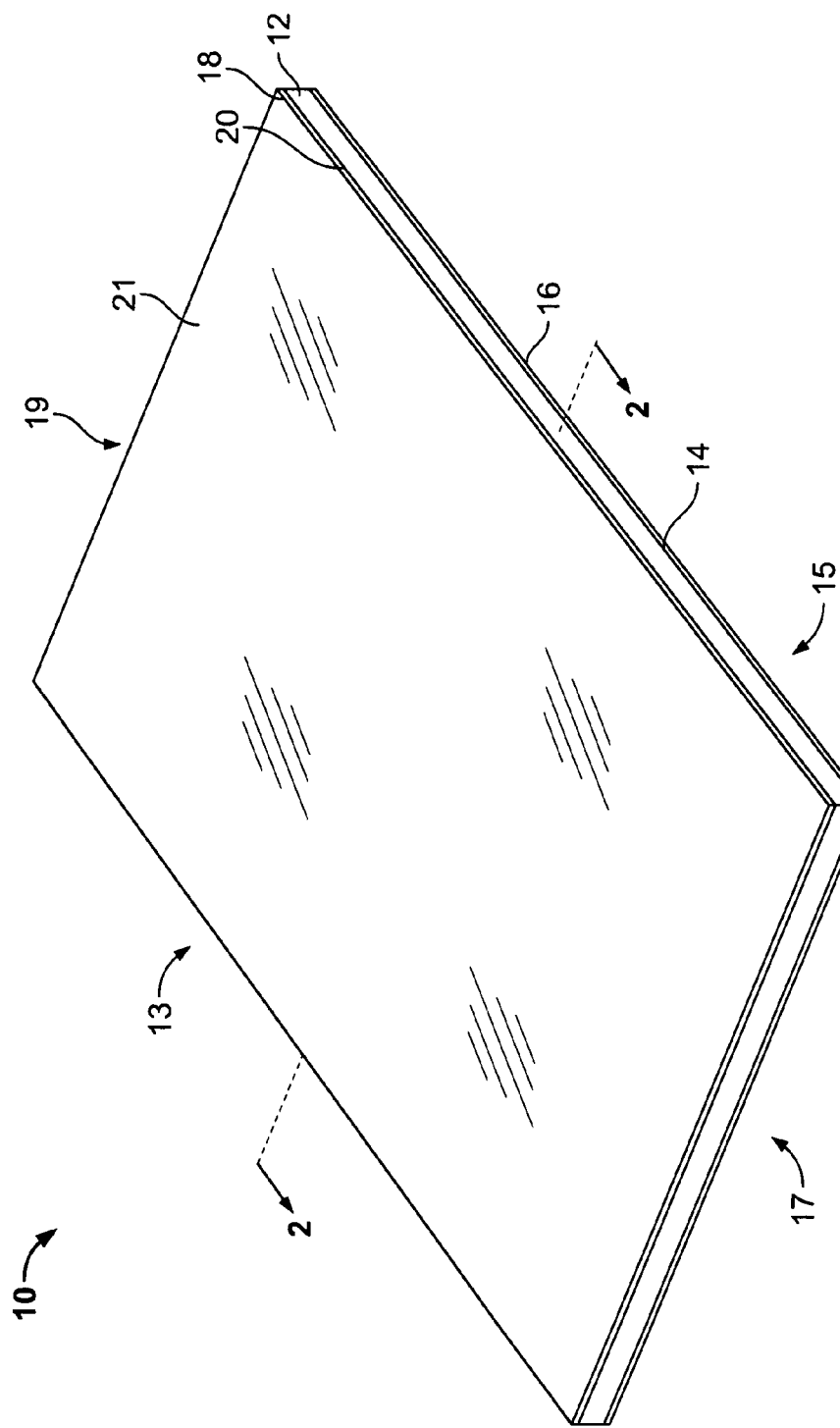
FIG. 1 is a perspective view of a touchscreen cover sheet assembly formed in accordance with an embodiment of the present invention.
Figure 2:
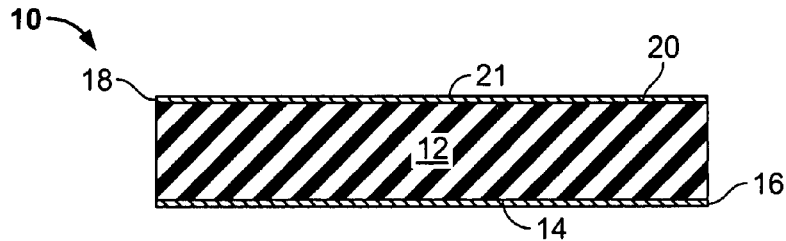
FIG. 2 is a cross-sectional view the touchscreen cover sheet assembly shown in FIG. 1 taken along line 2-2 of FIG. 1.

FIG. 1 is a perspective view of a touchscreen cover sheet assembly 10 formed in accordance with an embodiment of the present invention. FIG. 2 is a cross-sectional view of the touchscreen cover sheet assembly 10. The assembly 10 may be used with resistive touchscreen systems (not shown in FIGS. 1 and 2). Exemplary touchscreen systems incorporating the assembly 10 will be described in more detail below. The assembly 10 includes an insulating layer 12 having a surface 14 at least partially coated with an electrically conductive material 16. As will be described in more detail below, the electrically conductive material includes a plurality of microscopic linear conductive elements (MLCEs, not shown in FIGS. 1 and 2). The insulating layer 12 extends between end portions 13, 15, 17, and 19. The insulating layer 12 may optionally include a coating 18 on a surface 20 that is opposite the surface 14 to facilitate increasing the durability of the cover sheet assembly 10 generally and/or the surface 20 specifically. The coating 18 may be fabricated from any suitable material(s), such as, but not limited to, an acrylic resin and/or glass.

When in use, and as described below in more detail with respect to FIG. 8, the assembly 10 is held over a substrate (not shown in FIGS. 1 and 2) of a touchscreen system such that the surface 14 and the electrically conductive material 16 thereon generally face the substrate. A surface 21 of the coating 18, or alternatively the surface 20 when the coating 18 is not included, provides an exposed touch surface that a user may touch to select an inputs displayed by the touchscreen system.

The insulating layer 12 may be fabricated from any suitable material(s) that enables the insulating layer 12 to function as described herein, such as, but not limited to, polyester, polyethylene terephthalate (PET), polyethylene naphthalate (PEN), and/or glass. Depending, for example, on the particular application(s) of the assembly 10 and/or the type of touchscreen system(s) the assembly 10 is used with, the insulating layer 12 may be completely transparent or partially transparent. In some embodiments, one or more portions of the insulating layer 12 may be opaque. The insulating layer 12 may have any suitable size and/or shape, such as, but not limited to, rectangular, circular, triangular, and/or oval-shaped, that enables the insulating layer 12 to function as described herein, for example, depending on the particular application(s) of the assembly 10 and/or the type and/or configuration of touchscreen system(s) the assembly 10 is used with.

Figure 3:
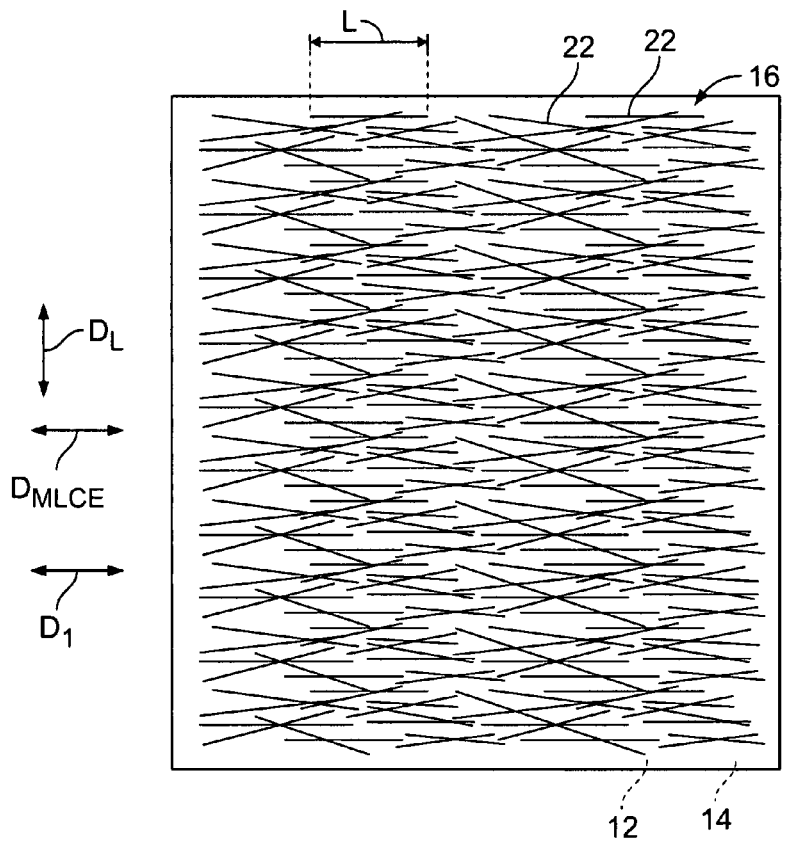
FIG. 3 is a schematic diagram of the touchscreen cover sheet assembly shown in FIGS. 1 and 2.
Figure 4:
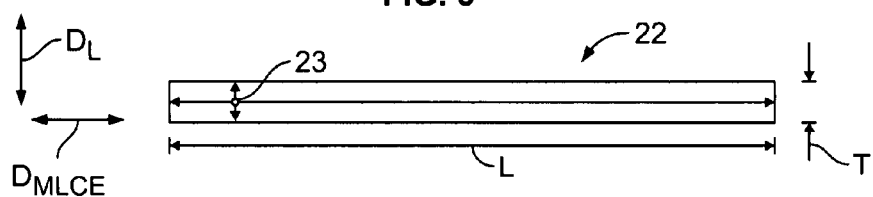
FIG. 4 is a schematic illustration of a microscopic linear conductive element (MLCE) of the touchscreen cover sheet assembly shown in FIGS. 1-3.

FIG. 3 is a schematic diagram of the cover sheet assembly 10 illustrating the plurality of MLCEs, which are designated by the reference numeral 22. FIG. 4 is a schematic illustration of an exemplary embodiment of an MLCE 22. For clarity, the size of the MLCEs 22 is exaggerated and the number of MLCEs 22 is reduced such that a density of the pattern of the MLCEs 22 is also reduced. The MLCEs 22 are arranged such that the electrically conductive material 16 has a predetermined transparency relative to a display (not shown) with which the assembly 10 is used. Specifically, some displays (not shown) used with touchscreens emit polarized light. For example, it is well known that some liquid crystal displays (LCDs) emit light that is polarized. More particularly, LCDs typically include a backlight, a polarizing film between the backlight and liquid crystal material, and a second polarizing film on the opposite side of the liquid crystal material. Each display pixel of the LCD functions as an electrically controlled light valve as a result of the effects of the liquid crystal on the orientation of the polarization of the light reaching the second polarizing film. Light exiting the second polarizing film is linearly polarized. Depending on the orientation of the polarizing axis of the second polarizing film, light emitted by the LCD may be horizontally polarized, vertically polarized, polarized at a 45° angle, or polarized at any other orientation. Horizontally polarized light is light for which the associated electric field oscillates in a horizontal direction. Vertically polarized light is light for which the associated electric field oscillates in a vertical direction. Light polarized at a 45° angle is light for which the associated electric field oscillates in a direction angled 45° with respect to both the horizontal and the vertical. The MLCEs 22 are each oriented relative to the polarization of the light emitted by the display to provide a predetermined transparency. The MLCEs 22 may be oriented such that the electrically conductive material 16 is partially transparent or completely transparent to polarized light emitted by the display. In some embodiments, it may be desired that not all portions of the electrically conductive material 16 have the predetermined transparency such that the MLCEs 22 at such portion(s) are not oriented to provide the predetermined transparency.

As used herein, the MLCEs 22 are each defined as a linear path within the electrically conductive material 16 that electrons move along. (As used herein, "electron" is shorthand for "a charge carrier that is either an electron or the semi-conductor concept of a 'hole'"). As described in more detail below, the MLCEs 22 may be, but are not limited to being, carbon nanoparticles, metal nanoparticles, the molecular chains of atoms of an electrically conductive polymer, and/or the like. In embodiments wherein the MLCEs 22 are molecular chains of atoms of an electrically conductive polymer, the MLCEs 22 are the linear paths of the molecular chains along which electrons move. In embodiments wherein the MLCEs 22 are carbon nanoparticles, metal nanoparticles, and/or the like, the MLCEs 22 are the bodies of the nanoparticles, metal nanoparticles, and/or the like that form linear paths along which electrons move. As shown in FIG. 4, some or all of the MLCEs 22 may optionally be elongate, such that the MLCEs 22 each have a length L that is substantially greater than their thickness T (and is substantially greater than their width, which in the exemplary embodiment of FIG. 4 is equal to the thickness T). For example, the MLCEs may have a length L that is 3 or more times their thickness T (and/or their width). Optionally, the length L may be ten or more times the thickness T (and/or their width). The elongate shape of the MLCEs 22 provides the MLCEs 22 with anisotropic electrical conductive properties. Although in the exemplary embodiments the MLCEs 22 have a generally circular cross section, such that the thickness T and the width of the MLCEs 22 are the same, the MLCEs 22 may each include any suitable cross-sectional shape. In the exemplary embodiments, the thickness T and the width dimensions of the MLCEs 22 are equal to or less than a micron, while the lengths L of the MLCEs 22 are greater than one micron. However, in some embodiments the thickness T and/or width dimensions of the MLCEs 22 may be greater than one micron. Moreover, the length L of the MLCEs 22 may be less than one micron. As used herein, the term "microscopic" and the prefix "nano" may refer to dimensions of less than or equal to one micron as well as dimensions of greater than one micron.

The MLCEs 22 are each oriented relative to the polarization of the light emitted by the display to provide a predetermined transparency to the light emitted by the display. For example, the lengths L of the MLCEs 22 may be arranged in a pattern that is oriented with respect to a direction $D_L$ of the electric field of the light emitted by the display such that the electrically conductive material 16 is more transparent to the polarization of light emitted by the display than to another polarization of light that is polarized in a direction $D_1$ that is perpendicular to the polarization direction $D_L$ of light emitted by the display. For example, the pattern of the MLCEs 22 may be oriented in an alignment direction $D_{MLCE}$ that is more aligned with the polarization direction $D_1$ of the other, non-display, polarization of light that is perpendicular to the polarization direction $D_L$ of light emitted by the display. Another example of an alignment direction $D_{MLCE}$ that is oriented with respect to the direction $D_L$ of the electric field of the light emitted by the display such that the electrically conductive material 16 provides a predetermined transparency to the polarization of light emitted by the display is a direction that is perpendicular to the surface 14 of the insulating layer 12. In such an embodiment wherein the alignment direction $D_{MLCE}$ extends perpendicular to the insulating layer surface 14, the alignment direction $D_{MLCE}$ extends perpendicular to both the polarization direction $D_L$ of light emitted by the display and the polarization direction $D_1$ of the other, non-display, polarization of light that is perpendicular to the polarization direction $D_L$ of light emitted by the display, and therefore the predetermined transparency is provided to light polarized in both the directions $D_L$ and $D_1$. Moreover, for a display that emits light that is unpolarized, the transverse wave nature of light still limits polarization components to the $D_L$ and $D_1$ directions, both of which are perpendicular to the direction $D_{MLCE}$ and therefore the same transparency benefits to displays emitting light that is unpolarized are provided by the embodiment wherein the alignment direction $D_{MLCE}$ extends perpendicular to the insulating layer surface 14. In such an embodiment wherein the alignment direction $D_{MLCE}$ extends perpendicular to the insulating layer surface 14, the electrical conductivity of the electrically conductive layer 16 may be reduced. Such a reduction in electrical conductivity may be at least partially recouped by using an embodiment wherein some of the MLCEs 22 are oriented in an alignment direction that extends perpendicular to the insulating surface and others of the MLCEs 22 are oriented in an alignment direction that extends parallel with the insulating layer surface 14.

In some embodiments, the pattern of the MLCEs 22 is oriented such that the electrically conductive material 16 is at least 1% more transparent to the light emitted by the display than to the light that is polarized perpendicular to the polarization of the light emitted by the display. In other embodiments, the pattern of the MLCEs 22 is oriented such that the electrically conductive material 16 is at least 2% more transparent to the light emitted by the display than to the light that is polarized perpendicular to the polarization of the light emitted by the display. In still other embodiments, the pattern of the MLCEs 22 is oriented such that the electrically conductive material 16 is at least 5% more transparent to the light emitted by the display than to the light that is polarized perpendicular to the polarization of the light emitted by the display.

In the exemplary embodiment of FIGS. 1-4, the alignment direction $D_{MLCE}$ in which the pattern of the MLCEs 22 is oriented is approximately aligned with the polarization direction $D_1$ of the other, non-display, polarization of light that is polarized perpendicular to the polarization direction $D_L$ of light emitted by the display. In other words, the alignment direction $D_{MLCE}$ is aligned approximately perpendicular to the polarization direction $D_L$ of light emitted by the display, which in the embodiment of FIGS. 1-4 is approximately vertical such that the direction DMLCE is approximately horizontal. The electric field of the polarized light emitted by the display will excite electrons to move within the MLCEs 22 along their thickness T (along the direction $D_L$). Thickness T of the MLCEs 22 is substantially smaller than their length L. The electrons excited by the electric field will not move as far as if they were excited to move along the length L of the MLCEs 22. Movement of an exemplary electron 23 along the thickness T of an MLCE 22 is illustrated in FIG. 4. Accordingly, the MLCEs 22 will interact less with, and therefore scatter or absorb less of, the polarized light emitted by the display than light that is unpolarized or is polarized in a direction oblique to the direction $D_L$ (e.g., the light polarized perpendicular to the light emitted by the display).

Not all of the MLCE 22 lengths L may be oriented approximately in the alignment direction $D_{MLCE}$. Rather, as shown in FIG. 3, in some embodiments the lengths L of some of the MLCEs 22 are not oriented approximately in the alignment direction $D_{MLCE}$, but rather are oriented oblique to the direction $D_{MLCE}$. However, the distribution of the orientations of the MLCEs 22 in the embodiment of FIG. 3 is such that the pattern of the MLCEs 22 has an average overall approximate orientation in the alignment direction $D_{MLCE}$. Specifically, the number of MLCEs 22 that have lengths L that are oriented approximately in the direction $D_{MLCE}$, and the angle of each MLCEs 22 that are angled obliquely to the direction $D_{MLCE}$, is sufficient to provide the predetermined transparency of the electrically conductive material 16 to the polarized light emitted by the display. Moreover, in order for the MLCEs 22 to form a conductive network within the electrically conductive material 16, the MLCEs 22 need to be electrically interconnected. Accordingly, the MLCEs 22 may deviate from being substantially straight along their length L, the MLCEs 22 may overlap each other (as shown in FIG. 3), and/or the MLCEs 22 may be suspended and/or contained within a matrix material (such as, but not limited to, an electrically conductive polymer) that has a sufficient electrical conductivity to electrically interconnect the MLCEs 22. In some other embodiments, the lengths L of all of the MLCEs 22 may be approximately oriented in the alignment direction $D_{MLCE}$, such as, but not limited to, embodiments wherein the alignment direction $D_{MLCE}$ extends approximately perpendicular to the surface 14 of the insulating layer 12 and/or when a template (described below) is used to arrange the MLCEs 22 in the desired orientation.

The thickness T of the MLCEs 22 may be selected such that the movement of the electrons caused by the electric field of the polarized light emitted by the display is small enough to provide the predetermined transparency of the electrically conductive material 16 to the polarized light emitted by the display. Any suitable value of the thickness T of the MLCEs 22 that provides the predetermined transparency to the polarized light emitted by the display may be selected, such as, but not limited to, between about molecular dimensions and about hundreds of nanometers in a range that is smaller than the wavelength of the polarized light emitted by the display.

In addition to providing the predetermined transparency to the polarized light emitted by the display, the exemplary orientation of the pattern of the MLCEs 22 shown in FIG. 3 may facilitate absorbing ambient light reflections. Specifically, the portion of ambient light that is polarized in a direction approximately parallel to the direction $D_{MLCE}$ will excite electrons to move along the length L of the MLCEs 22. Movement of an exemplary electron 23 along the thickness T and along the length L of an MLCE 22 is illustrated in FIG. 4. The larger movement of the electrons along the length L of the MLCEs 22, as compared with movement along the thickness T, will cause the MLCEs 22 to absorb the ambient light that is polarized approximately parallel to the direction $D_{MLCE}$. Accordingly, the electrically conductive material 16 may facilitate blocking a portion of ambient light from traveling through the insulating layer 12. As such, the electrically conductive material 16 can be used, for example, as a "neutral density filter" that facilitates increasing a contrast ratio of the display by suppressing ambient light reflected from a surface of the display.

The electrically conductive material 16, including the MLCEs 22, may be fabricated from any suitable material(s) that enables the electrically conductive material 16 to function as described herein, such as, but not limited to, carbon nanoparticles, metal nanoparticles, and/or electrically conductive polymers. The carbon nanoparticles may include any suitable shape, properties, structure, and/or the like that enables the carbon nanoparticles to function as described herein, such as, but not limited to, carbon nanotubes, carbon nanofibers, carbon nanospheres, and/or carbon nanowires. As used herein, the term "carbon nanotubes" means nanotubes that include carbon, for example a fullerene having a cylindrical configuration. The metal nanoparticles described herein may be fabricated from any suitable metals, such as, but not limited to, silver, bismuth, gold, nickel, tin, copper, zinc, and/or any other electrically conductive metal. The metal nanoparticles may include any suitable shape, properties, structure, and/or the like that enables the metal nanoparticles to function as described herein, such as, but not limited to, metal nanofibers, metal nanospheres, metal nanotubes, and/or metal nanowires. Examples of suitable electrically conductive polymers include, but are not limited to, thiophene derivative polymers and/or polythiophene derivative polymers. As described above, in embodiments wherein the electrically conductive material 16 is fabricated at least partially from carbon nanoparticles and/or metal nanoparticles, the nanoparticles are the MLCEs 22. As also described above, in embodiments wherein the electrically conductive material 16 is fabricated at least partially from an electrically conductive polymer, the MLCEs 22 are molecular chains of atoms (such as, but not limited to, carbon atoms) of the polymer. The electrically conductive material 16 may have any suitable structure including carbon nanoparticles, metal nanoparticles, and/or electrically conductive polymers that enables the nanoparticles and/or the molecular chain of atoms to be oriented and function as described herein. Examples of structures including carbon nanoparticles and/or metal nanoparticles that may be suitable for constructing the electrically conductive material 16 include, but are not limited to, layers, films, and/or fabrics consisting at least partially of a plurality of nanoparticles arranged in the desired orientation(s). The electrically conductive material 16 may be constructed of a fabric, layer, and/or film of carbon nanoparticles, metal nanoparticles, and/or molecular chains of atoms that is a monolayer of nanoparticles and/or molecular chains of atoms, or may optionally be constructed from a plurality of layers of carbon nanoparticles, metal nanoparticles, and/or molecular chains of atoms. In some embodiments, the carbon nanoparticles and/or metal nanoparticles may be suspended and/or contained in one or more other suitable materials that enable the electrically conductive material 16 to function as described herein, such as, but not limited to, transparent polymers and/or transparent ceramics. Examples of suitable polymers for the matrix include, but are not limited to, polymethyl methacrylate (PMMA) polyacrylates, polyacrylonitriles, polyvinyl alcohols, polyesters, polycarbonate, polyurethane, polyvinyl chloride and/or any other polymer soluble in a solvent. Examples of suitable solvents include, but are not limited to toluene, xylene, methyl ethyl ketone (MEK), and/or the like.

With regard to carbon nanoparticles, directed growth and/or chemical self-assembly of carbon nanoparticles may be used to grow or deposit the individual nanoparticles with suitably controlled orientation, length, and the like. With regard to carbon nanotubes, the electrically conductive material 16 may include single-walled carbon nanotubes and/or multi-walled carbon nanotubes. Moreover, the carbon nanotubes may be pristine, functionalized, and/or filled with another material, such as, but not limited to, a metal, to form "nanowires" encapsulated within carbon nanotube lumens.

The electrically conductive material 16 may be grown or deposited, when applicable, directly on the insulating layer surface 14 or may be pre-fabricated and deposited on the surface 14. The electrically conductive material 16 may be applied on insulating layer surface 14 using any suitable method, process, structure, and/or means that enables the electrically conductive material 16 to function as described herein, such as, but not limited to, spin coating, dipping, spraying (such as, but not limited to, aerosol application), screen printing operations, and/or growth directly on the surface 14 (such as, but not limited to, spin-coated catalyst-based growth and/or gas-phase catalyst-assisted chemical vapor deposition (CVD)). In some deposition processes, such as, but not limited to, spin coating, spraying, dipping, and/or screen printing processes, the conductive polymer atoms, the carbon nanoparticles, and/or the metal nanoparticles may be suspended and/or contained in a suitable solvent in a soluble or insoluble form. Parameters for controlling such exemplary types of application to the surface 14 include surface functionalization of the underlying surface, spin-coating parameters (such as, but not limited to, length, MLCE suspension concentration, spin coating solution concentration, and/or revolutions per minute (RPM)), the number of applications, temperature, pH, time, catalyst density/concentration, and/or growth environment (such as, but not limited to, growth time, growth temperature, and/or gas concentration). When the MLCEs 22 include carbon nanoparticles, the carbon nanoparticles may optionally be functionalized (such as, but not limited to, using a carboxylic group grafted to the carbon nanoparticles, using a disulfide group grafted to the carbon nanoparticles, using a thiophene group grafted to the carbon nanoparticles, and/or using planar conjugated hydrocarbons such as, but not limited to, pyrenes) to aid in enhancing the internal adhesion between nanoparticlestubes. During some of the applications discussed herein, carbon nanoparticles may exhibit a "self-assembly" trait where individual nanoparticles tend to adhere to a surface to which they are applied whenever energetically favorable. Individual carbon nanoparticles may adhere to each other as a consequence of van der Waals forces, depending, for example, on the particular application(s) of the assembly 10 and/or the type of touchscreen system(s) the assembly 10 is used with.

The MLCEs 22 may be arranged into the desired orientation using any suitable method, process, structure, and/or means, such as, but not limited to, using fluid flow alignment, screen printing, electrical field effects, a template that includes grooves sized and shaped to at least partially receive the MLCEs 22, and/or tendencies for self-alignment. Another example includes initially forming a randomly ordered network of the MLCEs 22 and then removing and/or destroying MLCEs 22 having an undesired orientation, such as, but not limited to, using polarized infrared and/or radio frequency (RF) heating. Still another example includes forming, such as, but not limited to, growing and/or depositing, the MLCEs 22 in the desired orientation pattern and securing the position of each of the MLCEs 22 by suspending and/or containing at least a portion of the MLCEs 22 within a matrix, such as, but not limited to, the polymer matrices described above.

The electrically conductive material 16 may be coated on the surface 14 in any suitable thickness that enables the electrically conductive material 16 to function as described herein. Optionally, the electrically conductive material 16 is coated on the surface 14 at a uniform thickness to provide consistent electrical properties, such as, but not limited to resistance. The thickness of the electrically conductive material 16 may, in some embodiments, be defined by a length of the MLCEs 22. In other embodiments, the thickness of the electrically conductive material 16 may be defined by a width, thickness, and/or diameter of the MLCEs 22 when the layer includes only one layer of the MLCEs 22, or may be defined by a multiple of the width, thickness, and/or diameter of the MLCEs 22 when the electrically conductive material 16 includes more than one layer of the MLCEs 22. The material(s) and/or thickness, for example, of the electrically conductive material 16 may be selected to provide any suitable resistance that enables the electrically conductive material 16 to function as described herein, such as, but not limited to, a resistance of between about 100 Ohms/square and about 1000 Ohms/square. The selected resistance may depend, for example, on the particular application(s) of the assembly 10 and/or the type of touchscreen system(s) the assembly 10 is used with.

Figure 5:
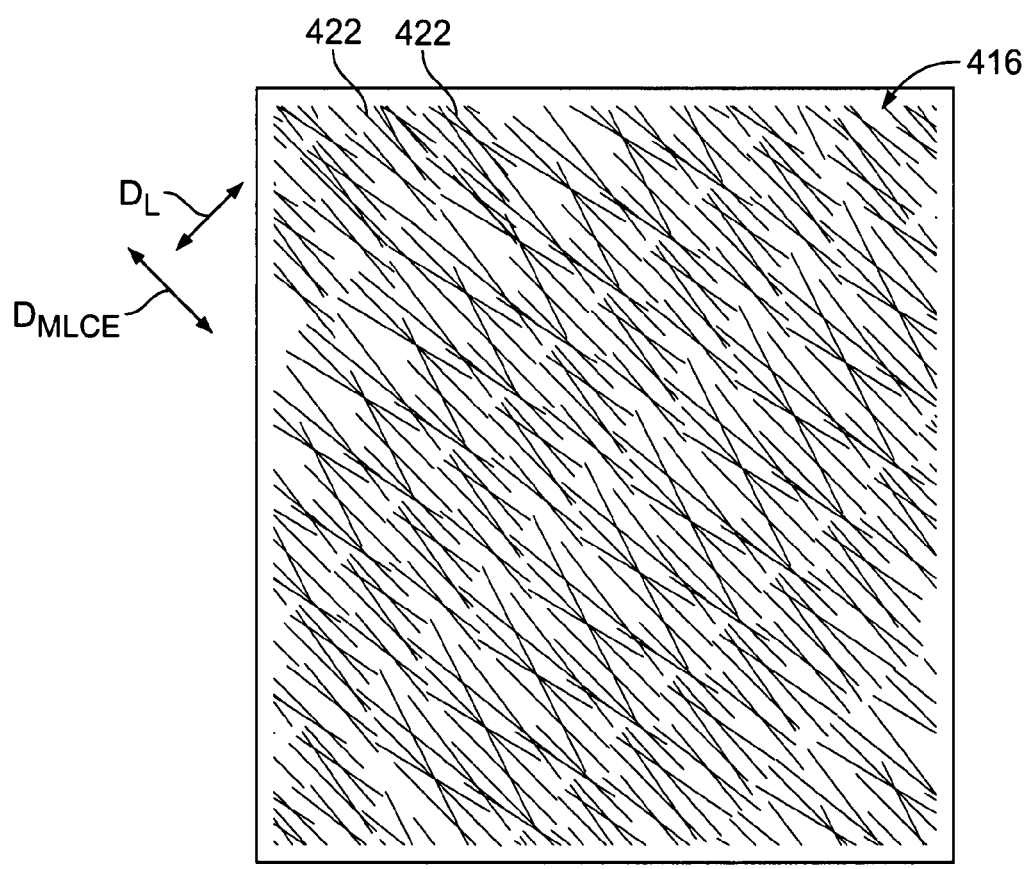
FIG. 5 is a schematic diagram of a touchscreen cover sheet assembly formed in accordance with an alternative embodiment of the present invention.
Figure 6:
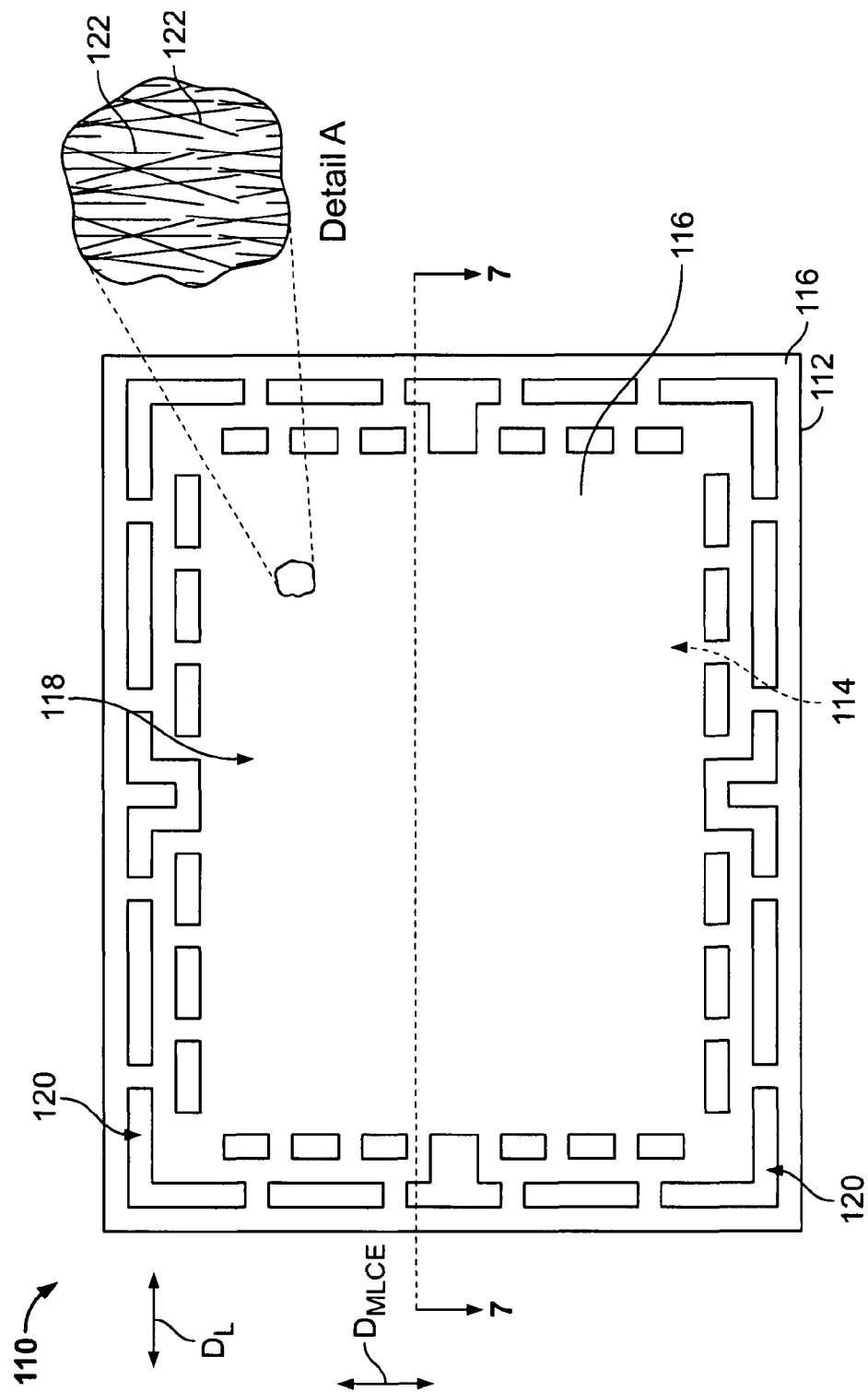
FIG. 6 is a top plan view of a touchscreen substrate assembly formed in accordance with an embodiment of the present invention.

Although the direction $D_L$ of the electric field of the polarized light emitted by the display is shown in FIGS. 3 and 4 as being approximately vertical, the direction $D_L$ is not limited to approximately vertical (as seen in FIGS. 3 and 4). Rather, the light emitted by the display may be polarized in any direction $D_L$ (and the alignment direction $D_{MLCE}$ may be selected as any direction relative to the direction $D_L$ that provides the predetermined transparency). For example, the direction $D_L$ may alternatively be approximately horizontal (as shown in FIG. 6). The direction $D_L$ may also be other directions other than approximately horizontal and approximately vertical. For example, FIG. 5 illustrates an embodiment wherein the polarization direction $D_L$ of light emitted by the display extends approximately 45° to horizontal and vertical. In the exemplary embodiment of FIG. 5, the alignment direction $D_{MLCE}$ of a pattern of a plurality of MLCEs 422 of an electrically conductive material 416 is approximately perpendicular to the direction $D_L$ of the polarized light emitted by the display.

The electrically conductive material 416 and the MLCEs 422 are substantially similar to the electrically conductive material 16 (FIGS. 1-3) and the MLCEs 22, respectively. Accordingly, the description and illustration of the electrically conductive material 16 and the MLCEs 22 is applicable to the electrically conductive material 416 and the MLCEs 422. For example, the configuration, material construction, structure thickness, electrical properties, mechanical properties, advantages, application methods and/or means, and the like of the electrically conductive material 416, as well as the advantages, configuration, arrangement, structure, material construction orientation, size, shape, and the like of the MLCEs 422 are substantially similar to that of the electrically conductive material 16 and the MLCEs 22, respectively. Accordingly, the electrically conductive materials 416 and the MLCEs 422 will not be described in further detail herein.

Figure 7:
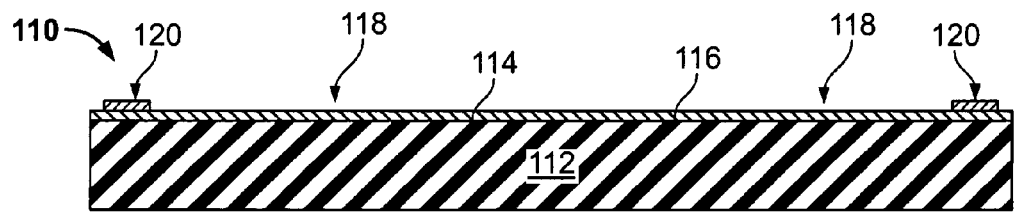
FIG. 7 is a cross-sectional view of the touchscreen substrate assembly taken along line 7-7 of FIG. 6.

FIG. 6 is a top plan view of a touchscreen substrate assembly 110 formed in accordance with an embodiment of the present invention. FIG. 7 is a cross-sectional view of the assembly 110 taken along line 7-7 of FIG. 6. The assembly 110 may be used with any suitable touchscreen system, for example, resistive or capacitive touchscreen systems (not shown in FIGS. 6 and 7). Exemplary touchscreen systems incorporating the assembly 110 will be described in more detail below. The assembly 110 includes a substrate 112 having a surface 114 at least partially coated with an electrically conductive material 116. The electrically conductive material 116 coating the surface 114 provides an electrically conductive touch area 118 on the surface 114. The assembly 110 includes a network of resistors, formed by a pattern of electrically conductive electrodes 120, on the electrically conductive material 116 that border the touch area 118.

The electrically conductive material 116 includes a plurality of MLCEs 122, which are illustrated in detail A. For clarity, the size and spacing of the MLCEs 122 may be exaggerated and the number of MLCEs 122 may be reduced such that a density of the overall pattern of the MLCEs 122 is also reduced. As with the MLCEs 22 (FIGS. 3 and 4), the MLCEs 122 are arranged such that the electrically conductive material 116 has a predetermined transparency relative to a display (not shown) with which the assembly 110 is used. In the exemplary embodiment, the MLCEs 122 arranged such that the overall pattern of the MLCEs 122 is oriented in the direction $D_{MLCE}$ that is generally perpendicular to the direction $D_L$, such that the electrically conductive material 116 is generally completely transparent to polarized light emitted by the display.

The electrically conductive material 116 and the MLCEs 122 are substantially similar to the electrically conductive material 16 (FIGS. 1-3) and the MLCEs 22, respectively. Accordingly, the description and illustration of the electrically conductive material 16 and the MLCEs 22 is applicable to the electrically conductive material 116 and the MLCEs 122, respectively. For example, the configuration, material construction, structure thickness, electrical properties, mechanical properties, advantages, application methods and/or means, and the like of the electrically conductive material 116, as well as the advantages, configuration, arrangement, structure, material construction orientation, size, shape, and the like of the MLCEs 122 is substantially similar to that of the electrically conductive material 16 and the MLCEs 22, respectively. Accordingly, the electrically conductive material 116 and the MLCEs 122 will not be described in further detail herein. However, it may be noted that unlike the electrically conductive material 16, the electrically conductive material 116 is not flexed when the touched by a user and accordingly the electrically conductive material 116 may, in some embodiments, be fabricated with a more brittle construction.

The anisotropic properties of the MLCEs 122 of the electrically conductive material 116 may have an effect on the operation of a touchscreen system that includes the assembly 110. For example, the anisotropic properties of the MLCEs 122 may cause errors or changes in coordinate measurements of the touch area 118 when touched by a user. Such errors or changes may need to be corrected for, for example using correction coefficients determined during calibration of the touchscreen system.

In the exemplary embodiment, the electrodes 120 are disposed directly on the electrically conductive material 116. Alternatively, the electrodes 120 are disposed directly on the substrate surface 114 underneath the electrically conductive material 116. The pattern of the electrodes 120 is meant as exemplary only and therefore the electrodes 120 are not limited to the pattern shown in FIG. 6. Rather, the electrodes 120 may have any suitable pattern that enables the touchscreen substrate assembly 110 to function as described herein. Similarly, the electrodes 120 may have any suitable size, shape, resistance, electrical conductivity, and/or be fabricated from any suitable material(s) (such as, but not limited to, silver frit and/or the material of the electrically conductive material 116 with a higher density of MLCEs 22), which may depend, for example, on the particular application(s) of the assembly 110 and/or the type of touchscreen system(s) the assembly 110 is used with. Depending, for example, on the particular application(s) of the assembly 110 and/or the type of touchscreen system(s) the assembly 110 is used with, the electrodes 120 may be completely transparent, partially transparent, or opaque. In the assembly 110, certain regions of the electrically conductive material 116 may be removed to form deletion lines (not shown) that are sometimes included in combination with conductive electrodes 120 in designs of known touchscreen substrates.

The substrate 112 may be fabricated from any suitable material(s) that enables the substrate 112 to function as described herein, such as, but not limited to, glass, ceramic, and/or plastic. Depending, for example, on the particular application(s) of the assembly 110 and/or the type of touchscreen system(s) the assembly 110 is used with, the substrate 112 may be completely transparent or partially transparent. The substrate 112 may have any suitable size and/or shape, such as, but not limited to, rectangular, circular, triangular, and/or oval-shaped, that enables the insulating layer 112 to function as described herein, for example, depending on the particular application(s) of the assembly 110 and/or the type and/or configuration of touchscreen system(s) the assembly 110 is used with.

The touch area 118 may have any suitable size and/or shape, such as, but not limited to rectangular, circular, triangular, and/or oval-shaped, that enables the touch area 118 to function as described herein, for example, depending on the particular application(s) of the assembly 110 and/or the type of touchscreen system(s) the assembly 110 is used with. In the exemplary embodiments, the touch area 118 has a generally rectangular shape and covers the area of the substrate surface 114 that is framed by the electrodes 120.

Figure 8:
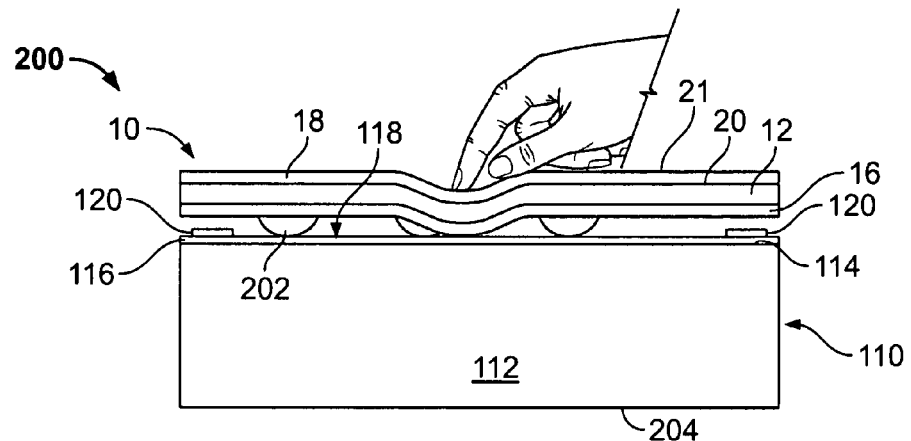
FIG. 8 is a cross-sectional view of a resistive touchscreen system formed in accordance with an embodiment of the present invention.

FIG. 8 is a cross-sectional view of a resistive touchscreen system 200 that may include the touchscreen substrate assembly embodiments and/or the cover sheet assembly embodiments described and/or illustrated herein. In some embodiments, the resistive touchscreen system 200 is a four-wire system. Alternatively, the system 200 may be a five-wire system. The system 200 may be mounted on any suitable display (not shown), such as, but not limited to, an LCD and/or any other type of display that emits polarized light. In the exemplary embodiment, the system 200 includes both the cover sheet assembly 10 and the substrate assembly 110, which as discussed above includes the substrate 112, the electrically conductive material 116, the electrically conductive material 16, and the insulating layer 12. Alternatively, the system 200 includes either the assembly 10 or the assembly 110. In such embodiments wherein the system 200 only includes one of the assembly 10 or 110, the assembly that is not included is replaced by a similar assembly (not shown) that includes a known conventional electrically conductive coating.

The cover sheet assembly 10 is spaced from the substrate assembly 110 by a plurality of insulated dots 202. Specifically, the insulated dots 202 space the electrically conductive material 16 on the insulating layer 12 from the electrically conductive material 116 of the substrate assembly 110. A surface 204 of the substrate 112 opposite the surface 114 is typically placed over a face (not shown) of the display with which the touchscreen is being used. In 5-wire resistive touchscreen operation, a processor (not shown) electrically connected to the touch area 118 alternates a voltage across the touch area 118 in the X and Y directions. In 4-wire resistive touchscreen operation, a voltage gradient in the X direction on one of the materials 16 or 116 is alternated with a voltage gradient in the Y direction on the other of the materials 16 or 116. When a user makes an input by touching the touch surface (21, or alternatively the surface 20 when the coating 18 is not included) of the insulating layer 12 at a location within the touch area 118, the touch causes the insulating layer 12 to move toward the substrate 112. Movement of the insulating layer 12 towards the substrate 112 causes the electrically conductive material 16 on the insulating layer 12 to engage, and thereby make electrical contact with, the electrically conductive material 116 of the substrate assembly 110 at the location of the movement, or touch. An electrical circuit (not shown) connected to the processor digitizes the voltages or equipotentials associated with the touch and transmits the voltages or equipotentials to the processor, or a processor of the computer or other device, for processing the user's input.

Figure 9:
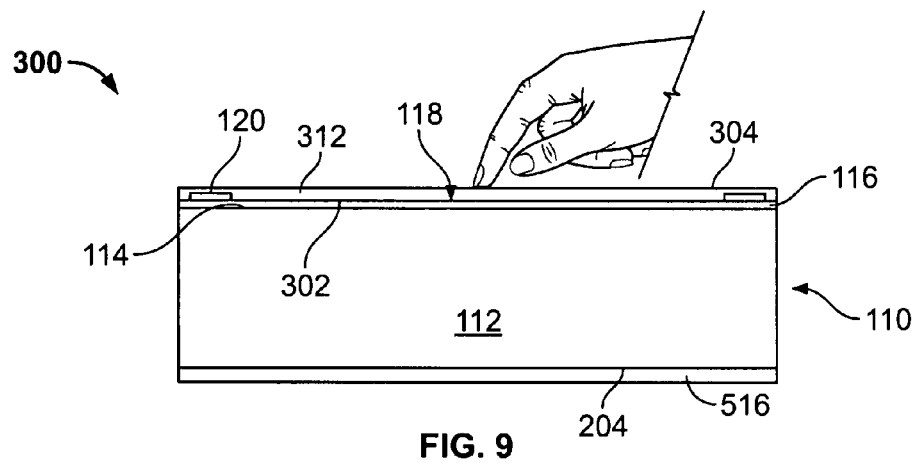
FIG. 9 is a cross-sectional view of a capacitive touchscreen system formed in accordance with an embodiment of the present invention.

FIG. 9 is a cross-sectional view of a capacitive touchscreen system 300 that may include the touchscreen substrate assembly embodiments described and/or illustrated herein. The system 300 may be mounted on any suitable display (not shown), such as, but not limited to, an LCD and/or any other type of display that emits polarized light. In the exemplary embodiment, the system 300 includes the substrate assembly 110, which as discussed above includes the substrate 112 and the electrically conductive material 116. The system 300 also includes an insulating layer 312 positioned over the touch area 118 of the assembly 110. Specifically, a surface 302 of the insulating layer 312 facing the substrate 112 is disposed directly on the electrically conductive material 116 on the substrate 112. The insulating layer 312 may also include a coating (not shown, such as, but not limited to, inorganic silica) on a surface 304 opposite the surface 302 to increase a durability of the insulating layer 312 generally and/or the surface 304 specifically. The surface 204 of the substrate 112 may optionally be at least partially coated with an at least partially transparent electrically conductive material 516. The electrically conductive material 516 may serve as a guard electrode that shields the system 300 from capacitive coupling and from electrical interference from the display. In some embodiments, the electrically conductive material 516 is fabricated from a known conventional electrically conductive coating. Alternatively, the electrically conductive material 516 includes MLCEs (not shown) that are arranged such that the electrically conductive material 516 has a predetermined transparency relative to the display. In the exemplary embodiment, the electrically conductive coating 516 includes MLCEs arranged such that the overall pattern of the MLCEs is oriented generally perpendicular to the direction of the electric field of the polarized light emitted by the display, such that the electrically conductive material 516 is generally completely transparent to polarized light emitted by the display.

The surface 204 of the substrate 112 opposite the surface 114 is typically placed over a face (not shown) of the display with which the touchscreen is being used. In operation, a processor (not shown) electrically connected to the touch area 118 applies an alternating or pulsed voltage to the touch area 118. When a user makes an input by touching the touch surface 304 (or alternatively a coating on the surface 304 when included) of the insulating layer 312 at a location within the touch area 118, an AC electrical current is drawn from the electrically conductive material 116 and shunted to ground through the user's body. The current to ground through the user is supplied by electrical circuits (not shown) connected to the electrodes 120. The electrical circuits provide measurements of the X and Y coordinates of the touch, which are communicated to the processor, or a processor of the computer or other device, for processing the user's input.

In the exemplary embodiment, the system 300 includes both the electrically conductive material 116 and the electrically conductive material 516. Alternatively, the system 300 only includes either the material 116 or the material 516. In such embodiments wherein the system 200 only includes one of the material 116 and the material 516, the material that is not included is replaced by a similar electrically conductive material (not shown) that is a known conventional electrically conductive coating. Optionally, the system 300 does not include any electrically conductive material at least partially coating the substrate surface 204.

The electrically conductive material 516 and the corresponding MLCEs are substantially similar to the electrically conductive material 16 (FIGS. 1-3) and the MLCEs 22, respectively. Accordingly, the description and illustration of the electrically conductive material 16 and the MLCEs 22 is applicable to the electrically conductive material 516 and the corresponding MLCEs. For example, the configuration, material construction, structure thickness, electrical properties, mechanical properties, advantages, application methods and/or means, and the like of the electrically conductive material 516, as well as the advantages, configuration, arrangement, structure, material construction orientation, size, shape, and the like of the corresponding MLCEs is substantially similar to that of the electrically conductive material 16 and the MLCEs 22, respectively. Accordingly, the electrically conductive material 516 and the corresponding MLCEs will not be described in further detail herein. Like the material 116 and unlike the material 16, the material 516 is not subject to flexing and hence may be of a more brittle construction.

The insulating layer 312 may be fabricated from any suitable material(s) that enables the insulating layer 312 to function as described herein, such as, but not limited to, silicon dioxide, glass, another type of inorganic layer, and/or polymer film, such as, but not limited to, polyester, polyethylene terephthalate (PET), and/or polyethylene naphthalate (PEN). Depending, for example, on the particular application(s) of the system 300, the insulating layer 312 may be completely transparent or partially transparent. In some embodiments, one or more portions of the insulating layer 312 may be opaque. The insulating layer 312 may have any suitable size and/or shape, such as, but not limited to, rectangular, circular, triangular, and/or oval-shaped, that enables the insulating layer 312 to function as described herein, for example, depending on the particular application(s) of the system 300.

The embodiments described and/or illustrated herein provide touchscreens having MLCE-based electrically conductive materials that may have an increased transparency to light polarized in a predetermined polarization direction while maintaining the desired degree of electrically conductivity of the electrically conductive material.

Exemplary embodiments are described and/or illustrated herein in detail. The embodiments are not limited to the specific embodiments described herein, but rather, components and/or steps of each embodiment may be utilized independently and separately from other components and/or steps described herein. Each component, and/or each step of one embodiment, can also be used in combination with other components and/or steps of other embodiments. When introducing elements/components/etc. described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc. Moreover, the terms "first," "second," and "third," etc. in the claims are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

While the invention has been described in terms of various specific embodiments, those skilled in the art will recognize that the invention can be practiced with modification within the spirit and scope of the claims.

What is claimed is:

1. A cover sheet assembly for a touchscreen system overlying a display, said cover sheet assembly comprising:
    an insulating layer having a surface configured to be disposed over an electrically conductive area of a substrate of the touchscreen system; and
    an electrically conductive material disposed on at least a portion of the insulating layer surface, the electrically conductive material comprising a plurality of microscopic linear conductive elements arranged in a pattern that is oriented with respect to a first direction of a first polarization of light emitted by the display such that the electrically conductive material is more transparent to the first polarization of light than to a second polarization of light that is polarized in a second direction that is perpendicular to the first direction.

2. The cover sheet assembly according to claim 1, wherein the pattern of the plurality of microscopic linear conductive elements is oriented in an alignment direction that is more aligned with the second direction of the second polarization of light than the first direction of the first polarization of light.

3. The cover sheet assembly according to claim 1, wherein the pattern of the plurality of microscopic linear conductive elements is oriented in an alignment direction that is approximately aligned with the second direction of the second polarization of light.

4. The cover sheet assembly according to claim 1, wherein the pattern of the plurality of microscopic linear conductive elements is oriented with respect to the first direction of the first polarization of light such that the electrically conductive material is at least 1% more transparent to the first polarization of light than to the second polarization of light.

5. The cover sheet assembly according to claim 1, wherein the microscopic linear conductive elements comprise at least one of an electrically conductive polymer, carbon nanoparticles, and metal nanoparticles.

6. A substrate assembly for a touchscreen system overlying a display, said substrate assembly comprising:
    a substrate; and
    an electrically conductive material disposed on at least a portion of a surface of the substrate to provide an electrically conductive touch area on the substrate, the electrically conductive material comprising a plurality of microscopic linear conductive elements arranged in a pattern that is oriented with respect to a first direction of a first polarization of light emitted by the display such that the electrically conductive material is more transparent to the first polarization of light than to a second polarization of light that is polarized in a second direction that is perpendicular to the first direction.

7. The substrate assembly according to claim 6, wherein the pattern of the plurality of microscopic linear conductive elements is oriented in an alignment direction that is more aligned with the second direction of the second polarization of light than the first direction of the first polarization of light.

8. The substrate assembly according to claim 6, wherein the pattern of the plurality of microscopic linear conductive elements is oriented in an alignment direction that is approximately aligned with the second direction of the second polarization of light.

9. The substrate assembly according to claim 6, wherein the pattern of the plurality of microscopic linear conductive elements is oriented with respect to the first direction of the first polarization of light such that the electrically conductive material is at least 1% more transparent to the first polarization of light than to the second polarization of light.

10. The substrate assembly according to claim 6, wherein the microscopic linear conductive elements comprise at least one of an electrically conductive polymer, carbon nanoparticles, and metal nanoparticles.

11. The substrate assembly according to claim 6, further comprising an insulating layer positioned over the touch area on the substrate, a surface of the insulating layer facing the substrate being disposed directly on the electrically conductive material on the substrate surface.

12. The substrate assembly according to claim 6, further comprising a cover sheet positioned over the touch area on the substrate, the cover sheet comprising an insulating layer and a second electrically conductive material disposed on at least a portion of a surface of the insulating layer that generally faces the substrate.

13. The substrate assembly according to claim 12, wherein the plurality of microscopic linear conductive elements are a first plurality of microscopic linear conductive elements and the pattern is a first pattern, and the second electrically conductive material comprises a second plurality of microscopic linear conductive elements arranged in a second pattern that is oriented with respect to the first direction of the first polarization of light such that the second electrically conductive material is more transparent to the first polarization of light than to the second polarization of light.

14. The substrate assembly according to claim 13, wherein the first and second electrically conductive materials are substantially the same material.

15. A substrate assembly for a touchscreen system overlying a display, said substrate assembly comprising:
    a substrate having a first surface and a second surface opposite the first surface; and
    a first electrically conductive material disposed on at least a portion of the first surface of the substrate to provide an electrically conductive touch area on the substrate; a second electrically conductive material disposed on at least a portion of the second surface of the substrate, the second electrically conductive material comprising a plurality of microscopic linear conductive elements arranged in a pattern that is oriented with respect to a first direction of a first polarization of light emitted by the display such that the second electrically conductive material is more transparent to the first polarization of light than to a second polarization of light that is polarized in a second direction that is perpendicular to the first direction.

16. The substrate assembly according to claim 15, wherein the pattern of the plurality of microscopic linear conductive elements is oriented in an alignment direction that is more aligned with the second direction of the second polarization of light than the first direction of the first polarization of light.

17. The substrate assembly according to claim 15, wherein the pattern of the plurality of microscopic linear conductive elements is oriented in an alignment direction that is approximately aligned with the second direction of the second polarization of light.

18. The substrate assembly according to claim 15, wherein the pattern of the plurality of microscopic linear conductive elements is oriented with respect to the first direction of the first polarization of light such that the electrically conductive material is at least 1% more transparent to the first polarization of light than to the second polarization of light.

19. The substrate assembly according to claim 15, wherein the microscopic linear conductive elements comprise at least one of an electrically conductive polymer, carbon nanoparticles, and metal nanoparticles.

20. The substrate assembly according to claim 15, wherein the plurality of microscopic linear conductive elements are a second plurality of microscopic linear conductive elements and the pattern is a second pattern, and the first electrically conductive material comprises a first plurality of microscopic linear conductive elements arranged in a first pattern that is oriented with respect to the first direction of the first polarization of light such that the first electrically conductive material is more transparent to the first polarization of light than to the second polarization of light.

* * * * *